UNITED STATES PATENT OFFICE.

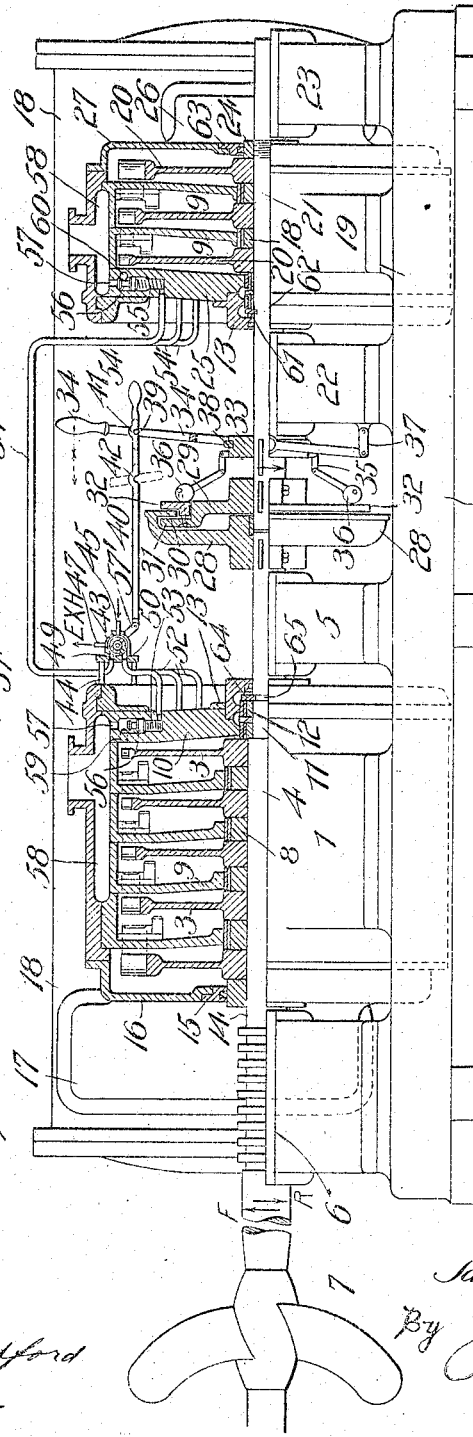

JAMES WILKINSON, OF BIRMINGHAM, ALABAMA, ASSIGNOR TO WILKINSON TURBINE COMPANY, A CORPORATION OF ALABAMA.

MARINE TURBINE.

No. 930,584.   Specification of Letters Patent.   Patented Aug. 10, 1909.

Application filed September 6, 1904. Serial No. 223,536.

*To all whom it may concern:*

Be it known that I, JAMES WILKINSON, a citizen of the United States, residing at Birmingham, in the county of Jefferson and State of Alabama, have invented new and useful Improvements in Marine Turbines, of which the following is a specification.

My invention relates to compound reversible turbines particularly designed and adapted for marine propulsion.

Where a separate turbine has been used to reverse the vessel, it has heretofore been the practice to connect it with a shaft of a forward driving turbine. This is particularly true in connection with sets of marine turbines which include one or more reversing turbines. It must be evident that no advantage is gained when the turbines, which normally drive the vessel forward, are forced to drive the idle reversing turbines. Such an arrangement not only unnecessarily increases the work on the forward turbines, but also produces a frictional wear upon the reversing turbines, which it is desirable to avoid. According to my present invention, I mount the reversing turbine upon a short shaft, arranged in alinement with and disposed end to end to the main propeller shaft, normally operated by a forward driving turbine. I provide a clutch mechanism whereby the shafts may be coupled up when it is desired to bring the reversing turbine into service to operate the propeller shaft, and disconnected when the forward driving turbine is in service.

One object of my invention therefore, is to provide means for disconnecting a reversing from a forward driven propeller shaft, and I desire to claim this arrangement broadly without limitation to the friction clutch which is my preferred means.

It is a further object to provide against the possibility of motor fluid being simultaneously admitted to both turbines, by using a common controller mechanism for them, and so connecting it up with the clutch mechanism, that as the latter is moved into and out of operation, the motor fluid supply will be cut off from one or the other turbine.

It is a further object to construct either or both turbines so as to utilize the motor fluid pressure in a novel manner to assist in counteracting the thrust of the propeller.

These and other improvements in the construction and arrangement of parts comprised in my present invention are hereinafter more fully explained, reference being had to the accompanying drawings, wherein:—

Figure 1, is a side elevation of both turbines, shown partly in section, the controller mechanism being shown in the position when the reversing turbine is inactive. Fig. 2, shows the controller mechanism in the position when both turbines are inactive, and Fig. 3, its position when the reversing turbine alone is active. Fig. 4, is a detail showing the relative pressure areas around the shaft.

Similar reference characters refer to the same parts throughout.

The turbine 1, mounted on a bed plate 2, is provided with a plurality of bucket wheels 3 keyed or otherwise secured to the propeller shaft 4, which is mounted in bearings 5 and 6; the latter of which is adapted to serve as a thrust bearing for shaft 4 which may be provided with one or more propellers 7. The several wheels 3 are provided with shouldered hub portions, between which are interposed spacer rings 8 of a thickness almost equal to that of the hub portions. Suitable packing devices are disposed between these rings and the diaphragms 9 which divide the interior of the turbine into wheel compartments. It will be noted that no ring 8 is disposed between the first wheel and the supply head 10, the shaft 4 being reduced at 11 and packing devices 12 of any desired character placed thereon in a stuffing box 13 to prevent the leakage of pressure around the shaft. By this arrangement the high pressure admitted in the manner hereinafter described, to the first wheel compartment acts against the first wheel in a manner to assist the bearing 6 in counteracting the thrust due to the push of the propeller which is toward the head 10, for the thick ring 8 engaging one face of the first wheel causes it to be unbalanced by reason of the fact that a less area will be exposed to the compartment pressure on the side of the wheel toward the exhaust than toward the supply end of the turbine. This is more clearly shown by the dotted circles *a* and *b* which illustrate, by the area between them, the extent to which the wheel is unbalanced. In this manner other of the wheels may be unbalanced by varying their exposed areas on opposite sides. The essential feature of this part of my invention is that the group of wheels should be unbalanced by the governed or variable motor fluid pressure in the turbine, hence any other arrangement for varying the exposed areas of the wheels so as to unbalance them may be used. Since the thrust of the propeller varies with the number of its revolutions per minute and the rotation of the propeller shaft varies with the supply or first stage pressure, it will be seen that the internal pressure and the propeller thrust will vary simultaneously. In other words, as the internal pressure unbalancing the wheels rises or falls, the propeller thrust will increase or diminish, so that these influences acting on the group of wheels may be made to substantially balance each other under varying conditions.

The shaft 4 has a shoulder 14 against which the last spacer ring abuts, a packing gland 15, carried by the exhaust head 16, surrounding the ring and preventing leakage at this point. A conduit 17 connects the exhaust head with a condenser 18.

The reversing turbine 19 is mounted upon the bed plate 2 and provided with wheels 20 having their buckets disposed in a reverse manner to the buckets of wheels 3, in turbine 1. These wheels 20 are fixed to a short or stub shaft 21 mounted in bearings 22, 23, and disposed end to end with shaft 4. Spacer rings 18, as in turbine 1, are placed between the wheels, the last ring 24 being screwed on the shaft, which is not shouldered. The first wheel is unbalanced as indicated by the dotted circles, and acts to assist the bearing 6 to counteract the thrust due to the pull of the propeller shaft when driven by the reversing shaft 21. A stuffing box 13, for shaft 21, is connected to the supply head 25 of the reversing turbine, which is subdivided into wheel compartments by diaphragms 9, and provided with a conduit 26 leading from its exhaust head 27 to the condenser 18.

The adjacent ends of shafts 4 and 21 project beyond their respective bearings 5 and 22, a recessed disk 28 being keyed to shaft 4, and a friction wheel 29 to the shaft 21. The disk 28 has a flange 30 adapted to be clamped between the rim 31 of wheel 29 and a movable sleeve 32, between which parts the flange normally runs freely. When it is desired to operate the reversing turbine, a collar 33 on shaft 21 is moved by a lever 34 and, by means of links 35, forces the cams 36, which are pivotally connected to studs fastened to the rim 31 and projecting through the sleeve 32, against the sleeve so that it, in turn, is forced into frictional engagement with the flange 30 of the disk 28. The disk and wheel being keyed to shafts 4 and 21 respectively, will thus act as a clutch to couple these shafts up, when the admission of motor fluid to turbine 19 will reverse the propeller shaft. The collar 33 is connected by a slot and key to the shaft 21. The lever 34 is connected at its lower end to a link 37 pivoted to bearing 22, and, at an intermediate point, to a slip collar 38 surrounding collar 33. Near its upper end the lever is provided with a lug or pin 39 which supports a lever 40 notched at 41 and 42, and connected to the fluid pressure controller mechanism, which will now be briefly described.

My controller mechanism, which is more fully described and claimed in Letters Patent issued to me, comprises a casing 43, mounted on supports 44 connected to turbine 1, to which high pressure is supplied through a pipe 45. Within the casing is a cylindrical hollow valve shell 46 exposed at one end to the atmosphere through a port 47 and provided with a single row of ports 48 which register with one or the other of two rows of ports 49 and 50 leading through casing 43. A port (not shown) admits the high pressure in the casing to the other end of the shell, and a pressure tight piston 51, movable therein acts to expose ports 48 to one or the other pressures. As shown in Fig. 1, ports 48 register with ports 50 which communicate with pipes 52 leading to motor cylinders 53 in head 10 of turbine 1. At the same time the shell 46 is so constructed that it exposes ports 49 to the high pressure in the casing 43. These ports communicate with a plurality of pipes 54, which lead across to motor cylinders 55 in head 25 of turbine 19.

The admission of high pressure to cylinders 53 and 55 acts against piston operated valves 56 to cause them to close ports 57, which admit motor fluid pressure from supply passages 58 to the supply nozzle passages 59 of turbine 1, and to the reversely disposed nozzle passages 60 for turbine 19. If desired springs may be used to assist the controller pressure in closing valves 56 against the motor fluid pressure. I may provide any desired number of nozzle passages 59 or 60, arranging them around the turbines, or grouping them.

When a motor cylinder is exposed to the atmosphere, which is the case when the pipe that leads from it to a port in casing 43 is in communication with the atmosphere in shell 46, the supply pressure will open the valve against the spring and flow through a supply nozzle which directs it against the buckets in the first wheel compartment. Thence it flows through succeeding stage nozzles against the several bucket wheels to the exhaust, valves being used between stages or not, as desired.

When the ports 48, in shell 46, register with the ports 49 in the casing, the pipes 52 will be exposed to the high pressure in the casing and the several supply valves for turbine 1 moved thereby to a closed position to cut that turbine out of service. The shell is preferably moved by a crank 57, which is pivoted to the lever 40, before referred to. The movement of the piston 51 in the shell exposes more or less of the ports 48 to the exhaust pressure, thus causing the valves, controlled by the pipes with which said ports are in register, to open successively. As shown in Fig. 2, the shell is in a position to expose both sets of ports 49 and 50 to the high pressure in the casing, which will close the valves of both turbines. In Fig. 3, the valves of turbine 1 would be closed by the admission of high pressure through ports 50 to pipes 52, while more or less of the valves of the reversing turbine would be opened according to the position of the piston 51 in the shell 46. This piston may be actuated in any desired manner.

As shown in Fig. 1, the notch 41 of the lever 40 engages pin 39 on the clutch lever 34, which is shown in the position when the clutch is disengaged. If the lever be thrown to cause the clutch members to engage and couple up the shafts, its movement will carry the lever 40 with it, shifting it to the position shown in dotted lines. In this latter position the controller shell will occupy the position shown in Fig. 3, when the turbine 1 will be cut out of service and the reversing turbine utilized to drive shaft 4. The lever 40 may be lifted out of engagement with the pin, if desired, to move it to the intermediate position shown in Fig. 2, or to enable the clutch and controller mechanism to be operated independently.

The construction of the controller mechanism, as well as the valves and their motors, represent only preferred forms, and may be varied without affecting the spirit of my invention.

The threaded ring 24, in turbine 19, serves the purpose of a circular nut, having suitable openings for a spanner wrench and acting to hold the several wheels and rings tightly against a locking ring 61 which is seated in a channel 62 in shaft 21. A packing gland 63 surrounds said nut. The turbine 1 has a locking ring 64, corresponding to 61 and seated in a channel 65 in shaft 4.

I have shown three each of the pipes 52 and 54, leading respectively to cylinders 53 and 55, only one of each of which is shown, the others being disposed around the supply head. The number of pipes used may be varied and each pipe may control one or more valves 56.

Having thus described my invention, what I claim as new and desire to protect by Letters Patent, is:—

1. The combination of a propeller shaft, a forward driving turbine connected thereto, a second shaft, a separate and independent reversing turbine connected thereto, and a friction clutch to connect and disconnect said shafts.

2. The combination with two reversely acting turbines, of separate shafts therefor disposed substantially in alinement, clutch means to connect said shafts, and a propeller driven by said shafts.

3. The combination with two reversely acting turbines, of separate shafts therefor disposed end to end, clutch means to connect said shafts, means adapted to be operated by said clutch means to cut one or the other of said turbines out of service.

4. The combination of two reversely acting turbines, a controller means adapted to cut one of said turbines out of service before admitting motor fluid to the other, separate shafts for said turbines, a propeller driven by one of said shafts, and means for connecting and disconnecting said shafts which is so coupled up with said controller means that when one of said turbines is disconnected by said means from the propeller shaft its supply of motor fluid is cut off.

5. In combination, a propeller shaft, a turbine for driving said shaft forward, a reversing turbine, a shaft therefor, a clutch means to connect said shafts, a lever for operating said clutch, and means operated by said lever to cut off the supply of motor fluid to said reversing turbine, when it is disconnected from the propeller shaft; and to the forward driving turbine when the reversing turbine is connected to said shaft.

6. In a compound marine turbine, a forward driving and a reversing turbine each having a plurality of fluid pressure nozzle passages, valve means to open and close said passages, a controller means for said valve means which operates them to close the nozzle passages of one turbine before opening those of the other turbine, separate shafts for said turbines, a clutch for connecting said shafts, a device for operating said clutch, which is also operatively connected to said controller means, substantially as described.

7. The combination of two reversely acting turbines on different shafts, a clutch to connect said shafts, a lever to operate said clutch, a common controller means for both turbines comprising a valve which controls the operation of fluid pressure actuated means to cut one turbine out of service when the other is active, a rod for operating said valve a connection between said rod and lever whereby the movement of the latter will shift the position of said valve.

8. The combination of two reversely acting turbines on different shafts, a clutch to connect said shafts, a lever to operate said clutch, a common controller means for both turbines comprising a valve which controls the operation of fluid pressure actuated means to cut one turbine out of service when the other is active, an operating rod connected to means for operating said valve, a lug on said lever, and notches in said rod which engage said lug, as and for the purposes described.

9. In a marine turbine, a propeller shaft, a thrust bearing therefor, bucket wheels fixed to said shaft, and means to unbalance one or more of said wheels so that the pressure in the turbine assists in counteracting the thrust of said shaft.

10. In a compound marine, a forward driving and a reversing turbine adapted to drive a propeller shaft, bucket wheels in said turbines, a thrust bearing for said shaft, and means to unbalance a wheel in each turbine so that the internal pressure therein assists said thrust bearing in counteracting the push or pull thrust of said propeller shaft.

11. In a marine turbine, a propeller shaft, bucket wheels fixed to said shaft, and spacer rings surrounding said shaft and disposed between said wheels, the ring or rings acting to expose less of the surface of one side of one or more of said wheels to the pressure within the turbine, whereby it or they are unbalanced in a manner to counteract the thrust of said shaft.

12. In a marine turbine, a propeller shaft, a thrust bearing therefor, bucket wheel compartments formed by diaphragms, bucket wheels disposed in said compartments and fixed to said shafts, and thick spacer rings surrounding said shaft opposite said diaphragms and in engagement with the adjacent faces of the wheels between which they are interposed, one or more of said wheels having a greater surface exposed to the compartment pressure on one side than on the other, whereby they are unbalanced and counteract the thrust of said propeller shaft.

13. In a marine turbine, a propeller shaft, a forward driving and a reversing turbine adapted to drive said shaft, and means adapted to simultaneously disconnect one of said turbines from said shaft and cut it out of service.

14. In a marine turbine, a propeller shaft, rotatable elements connected to said shaft, part of said elements carrying forward driving buckets and a part carrying reversing buckets, means to control the admission of motor fluid against said buckets, and means which act substantially simultaneously to disconnect the element or elements carrying the reversing buckets from said shaft and to cut off the supply of motor fluid from said reversing buckets.

15. In a marine turbine, a propeller shaft, bucket bearing elements connected thereto, forward driving buckets connected to part of said elements and reversing buckets connected to other of said elements, means to control the flow of motor fluid against said buckets, and means to substantially simultaneously disconnect the element or elements bearing one set of buckets from said shaft and reverse the flow of the motor fluid so that it acts against the buckets carried by the other element or elements which act to drive said shaft.

16. The combination of a propeller shaft, a forward driving turbine fixedly connected thereto, a second shaft, a reversing turbine connected thereto, and a friction clutch to connect and disconnect said shafts.

17. In a multi-stage turbine, diaphragm partitions dividing the interior of the turbine into stages, bucket wheels disposed in said stages, a shaft supporting said wheels, and a propeller driven by said shaft, the bucket wheel in a high pressure stage having unequal areas of its sides exposed to the motor fluid pressure in said stage so that said pressure unbalances the wheel and opposes the thrust of said propeller against the group of wheels.

18. In a turbine operating by stage expansion of the motor fluid, stage compartments, bucket wheels rotatable therein, a propeller shaft driven by said wheels, a thrust bearing for said shaft, means to pass motor fluid through said stage compartments, and means to unbalance the wheel in the initial stage so that the motor fluid therein acts against the propeller thrust, in the manner described.

19. In a multi-stage turbine, a casing, rotatable parts therein comprising a shaft and a plurality of bucket wheels mounted thereon, supply and stage nozzles through which motor fluid is discharged against said wheels, a propeller driven by said shaft, and means to utilize the motor fluid in the high pressure stage or stages to oppose the thrust of said propeller which consists in providing the rotatable parts with such areas exposed to the said stage pressure that they are unbalanced thereby and act in the manner described.

20. The combination with a propeller shaft, of two independent turbine units adapted to drive the same independently, said units being disposed and adapted to receive the motor fluid from reverse directions and one acting to drive the shaft in a reverse direction to the other, and means utilizing the internal pressure of the turbine which is driving the propeller shaft to unbalance the rotating parts thereof and counteract the thrust or pull of the propeller, substantially as described.

In testimony whereof I have hereunto set my hand in presence of two subscribing witnesses.

JAMES WILKINSON.

Witnesses:
 NOMIE WELSH,
 H. M. HARTON.